(12) United States Patent  
Cagliani et al.

(10) Patent No.: US 9,410,279 B2  
(45) Date of Patent: Aug. 9, 2016

(54) WASHING MACHINE WITH WATER STORAGE TANK

(71) Applicant: Whirlpool Corporation, Benton Harbor, MI (US)

(72) Inventors: Marco Cagliani, Varese (IT); Claudio Civanelli, Travedona Monate (IT); Daniele Martinello, Besozzo (IT)

(73) Assignee: Whirlpool Corporation, Benton Harbor, MI (US)

( * ) Notice: Subject to any disclaimer, the term of this patent is extended or adjusted under 35 U.S.C. 154(b) by 156 days.

(21) Appl. No.: 14/219,297

(22) Filed: Mar. 19, 2014

(65) Prior Publication Data

US 2014/0283564 A1    Sep. 25, 2014

(30) Foreign Application Priority Data

Mar. 19, 2013 (EP) .................................. 13159873

(51) Int. Cl.
| | | |
|---|---|---|
| *D06F 39/00* | (2006.01) | |
| *D06F 39/08* | (2006.01) | |
| *F16K 11/056* | (2006.01) | |
| *F16K 11/052* | (2006.01) | |

(52) U.S. Cl.
CPC ............ *D06F 39/085* (2013.01); *D06F 39/006* (2013.01); *D06F 39/083* (2013.01); *F16K 11/052* (2013.01); *F16K 11/056* (2013.01)

(58) Field of Classification Search
CPC .................................................... D06F 39/085
See application file for complete search history.

(56) References Cited

U.S. PATENT DOCUMENTS

2008/0092601 A1 *  4/2008  Konides ................ D06F 35/001
                                                                68/13 R
2012/0137447 A1 *  6/2012  Aykroyd ............... D06F 35/005
                                                                8/137

FOREIGN PATENT DOCUMENTS

| CN | 201321557 Y | 10/2009 |
|---|---|---|
| DE | 4409303 A1 * | 11/1995 |
| DE | 4409303 A1 | 11/1995 |
| DE | 19530042 A1 | 2/1997 |
| DE | 202013100539 U1 | 3/2013 |
| WO | 2009141218 A1 | 11/2009 |

OTHER PUBLICATIONS

European Search Report for Corresponding EP 13159873.2, Sep. 2, 2013.

\* cited by examiner

*Primary Examiner* — Michael Barr  
*Assistant Examiner* — Jason Riggleman

(57) ABSTRACT

A washing machine comprises a tub in which a drum is rotatably mounted, and a storage tank having a flow connection to the tub via a feeding line provided with a discharge pump and a three-port valve adapted to drive the flow to a drain or to the storage tank, rinsing fluid being stored in the storage tank for subsequent reuse. The washing machine further comprises an automatic valve connected to a drain line downstream the three-port valve and to an overflow line downstream the storage tank, said automatic valve being provided with means for avoiding any mixture of flows in the different configurations of the washing machine cycles.

9 Claims, 4 Drawing Sheets

WASHING MACHINE WITH WATER STORAGE TANK

CROSS-REFERENCE TO RELATED APPLICATIONS

This application claims the benefit of European Patent Application No. 13159873.2, filed Mar. 19, 2013, which is incorporated herein by reference in its entirety.

BACKGROUND

The present invention relates to a washing machine comprising a tub in which a drum is rotatably mounted, and a storage tank having a flow connection to the tub via a feeding line provided with a discharge pump and a three-port valve adapted to drive the flow to a drain line or to said storage tank. According to such features, a rinsing fluid can be stored in the storage tank and used in a subsequent washing cycle in order to reduce the overall amount of water used for washing laundry.

SUMMARY

A washing machine of the above kind is disclosed by WO2009/141218. In the recent years the water consumption of washers has been becoming one of the critical parameters for washer evaluation. Starting in 2013, there will be applied a new standard in the Energy Label (EU), affecting the amount of water allowed. This means that, besides the respect of the new norms, the water consumption is becoming more and more important.

One of the ways to reduce the water consumption is to use the same water more than once. For example, it is possible to use the water from a rinse of a cycle for the main wash of the following cycle. To do this, it is necessary to find a place, inside the washing machine, where to store the water from the rinse phase, with a bunch of components (pumps, valves, pipes etc.) to allow water flow.

The above known solution disclosed by WO2009/141218 allows storage of rinsing water in a storage tank, but it requires the use of two three-port valves (known also as "diverter valves"), one upstream the storage tank for diverting liquid to the tank or to a discharge line, and a second one for diverting the liquid from the discharge line to the drain or back to the tub by means of a circulation line. The use of two diverter valves makes the control of the washing machine more complex and also such diverter valves have to react rapidly in order to avoid cross flows. This increases the overall cost of the washing machine. Another disadvantage of the above known solution is the need to place the storage tank in a position so that it can be emptied by gravity.

It is an object of the present invention to provide a washing machine of the above type which does not present the above disadvantages and which has a low cost. According to the invention, such object is reached thanks to the features listed in the appended claims.

One of the main features of the invention is to provide the washing machine with an automatic control valve connected to the drain line downstream the three-port valve and to an overflow line downstream the storage tank. Such automatic control valve is provided with means for avoiding any mixture of flows in the different configurations of the washing machine, even with the use of a three-port valve actuated by wax motor.

According to a preferred embodiment of the invention, the automatic control valve is also connected directly to the tub by means of a vent hose. With an automatic valve according to the invention, any risk of storing dirty water in the storage tank is eliminated without the need of using a further diverter valve with related costs and complexity.

BRIEF DESCRIPTION OF THE DRAWINGS

Further advantages and features according to the present invention will become clear from the following detailed description, provided as non limiting example, with reference to the annexed drawings in which.

DESCRIPTION OF EMBODIMENTS OF THE INVENTION

Figure 1:
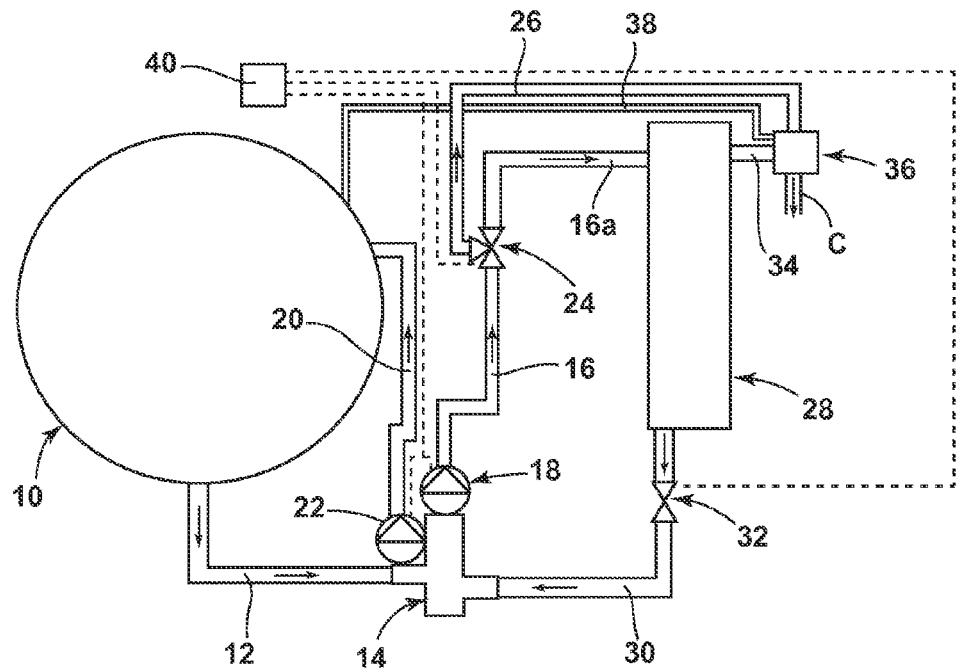
FIG. 1 is a hydraulic scheme of a washing machine according to the invention in which the directions of water in different lines of the circuit are shown by arrows.

With reference to the drawings, a washing machine according to the invention comprises a washing tub 10 having a discharge conduit 12 connected to a pump body 14 provided with a filter (not shown). To the pump body 14 two lines are connected, i.e. a feeding line 16 provided with a drain pump 18 and a recirculation line 20 with an auxiliary pump 22. Both drain pump 18 and auxiliary pump 22 are fitted on the same pump body 14. On the feeding line 16, downstream the drain pump, a three-port valve 24 is placed in order to alternatively drive the liquid to a drain line 26 or to a second portion 16a of the feeding line 16 connected to an upper position of a storage tank 28. The three-port valve 24 can be a two-position diverter valve with any kind of actuator, for instance a wax motor, an electric motor or a linear motor. In a lower position of the storage tank 18 a return line 30 connects the storage tank 28 to the pump body 14 with the interposition of a two-port valve 32 with an actuator of the same type or different type than the diverter valve 24. The storage tank 28 is also provided in its upper zone with an overflow line 34 which connect the tank to an automatic valve 36 from which liquid is sent to drain and to which a vent hose 38 from the tub 10 is connected. All the electrical components of the hydraulic circuit, i.e. the two pumps 18 and 22, the two-port valve 32 and the diverter valve 24 are driven in a predetermined sequence by a control unit 40.

The water storage tank 28 is the container capable to keep the water stored from the previous washing cycle. The sequence of operation starting from the main wash (in this phase the storage tank 28 is empty) is as follows.

At the end of the main wash phase, the drain pump 18 starts to empty the wash unit or tub 10. The position of the diverter valve 24 is such that the water is driven directly to the automatic valve 36 and then outside the washer to a sink or to a drain pipe C. Once the wash unit 10 is empty and the spin extraction done, the wash unit 10 is filled again with fresh water, and one (or more) rinse is performed.

At the end of the rinse, the diverter valve 24 is switched to drive the water to the water storage tank 28. The drain pump 18 starts to fill the storage tank 28 with the water to be reused. In case of too much water, the excess goes to the drain through the short overflow connection 34 between the storage tank 28 and the automatic valve 36. At the end the storage tank 28 is full. The diverter valve 24 is then switched back to the original position.

The rest of the washing cycle is performed normally, leaving the water storage tank 28 full at the end. During the next washing cycle, the two-port valve 32 is opened and the auxiliary pump 22 is activated in order to empty the storage tank. This brings the stored water to the wash unit 10, until the water storage tank 28 is empty. If the auxiliary pump 22 is not activated when the two-port valve is in its open configuration, then only a portion of the stored water flows to the tub 10 and this is an advantage when not all the stored water has to be used. The remaining water in the storage tank 28 may then be evacuated by using the drain pump 18 when the tub is emptied too.

When the two-port valve 32 is closed, the auxiliary pump 22 is switched off and some fresh water is taken from the tap through the detergent dispenser (not shown), to deliver the detergent to the wash unit 10. Only part of the water required is taken from the tap, because most of it has been taken from the storage tank 28, allowing a substantial water saving. At this point the situation is again as in step one above.

During the above sequence, without the automatic valve 36 (whose details will be disclosed in the following), a big inconvenience could happen. In the first step (wash unit emptying) water could go through the overflow pipe 34 to fill the water storage tank 28: since this is the water from the main wash, it is too dirty and is not suitable to be reused.

This issue is solved by using an automatic valve 36, which is a sort of self-operated four-port valve.

Figure 2:
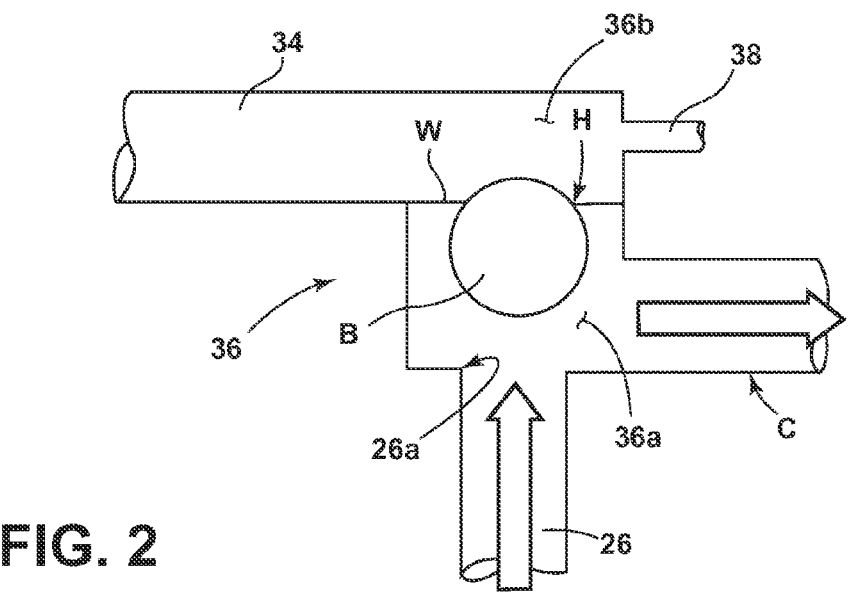
FIG. 2 is a schematic view of a component of the hydraulic circuit of FIG. 1, in a configuration corresponding to the draining of the tub.

With reference to FIG. 2, during the empting of the tub 10 after the main wash (first step), water coming from the discharge line 26 drives a floating ball B against a hole H provided in a wall W separating an inner chamber of the automatic valve 36 in two half chambers 36a and 36b. Therefore the overflow pipe 34 connected to the storage tank 28 is kept closed solving the above issue. The water is forced to the drain through C.

Figure 3:
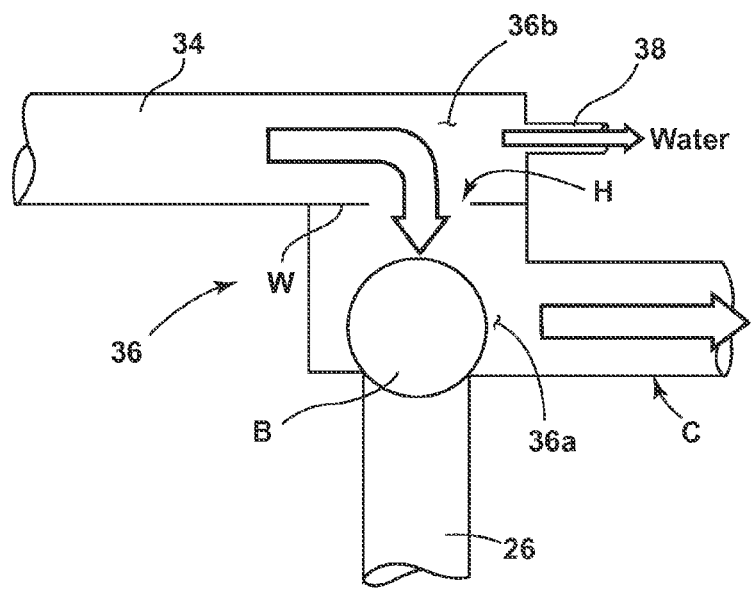
FIG. 3 is a similar to FIG. 2 and shows the component corresponding to an overflow from the storage tank.

During the filling of the storage tank 28 (FIG. 3), the excess water can flow freely through the valve connection C to the sink or to the drain pipe. The water is forced to the drain through C since discharge line 26 is closed by ball B resting on a valve seat 26a. In this configuration, a small amount of water can flow back to the wash unit 10 through the vent hose 38 connected to the automatic valve 36. Since the diameter of the hose 38 is much smaller than the discharge line 26, only a small amount of water will flow back, and anyway will be pumped again, until the wash unit 10 is empty.

Figure 4:
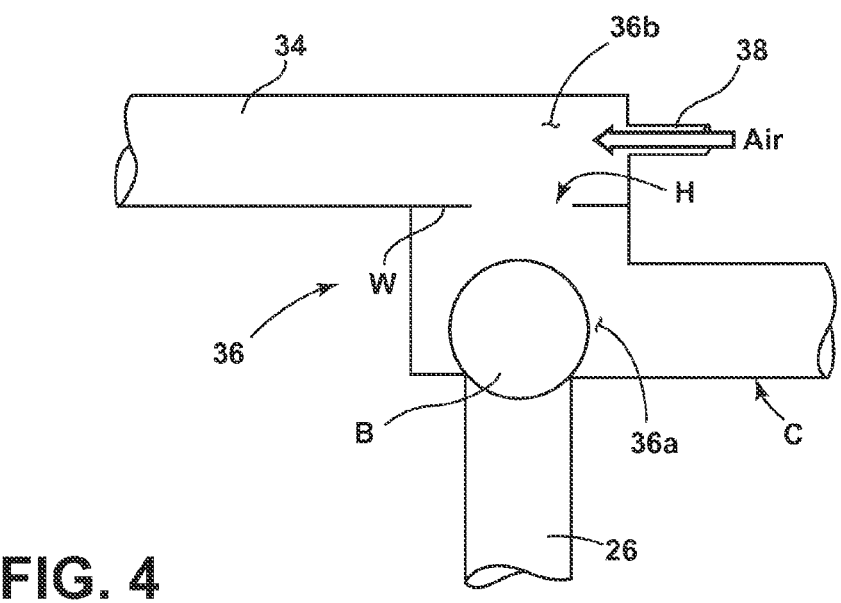
FIG. 4 is similar to FIG. 2 and shows the component in a configuration corresponding to the storage tank emptying.

During the water storage tank empting (first part of the filling of the wash unit 10) the air can enter to the storage tank 28 through the vent hose 38 connected to D (FIG. 4). In this way the water storage tank 28 is allowed to empty completely.

Figure 5:
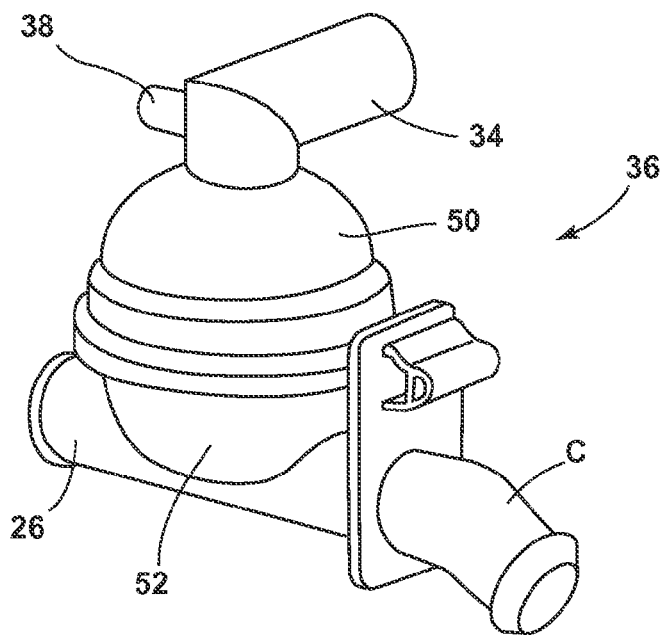
FIG. 5 is a perspective view of a component similar to the one schematically shown in FIGS. 2-4.
Figure 6:
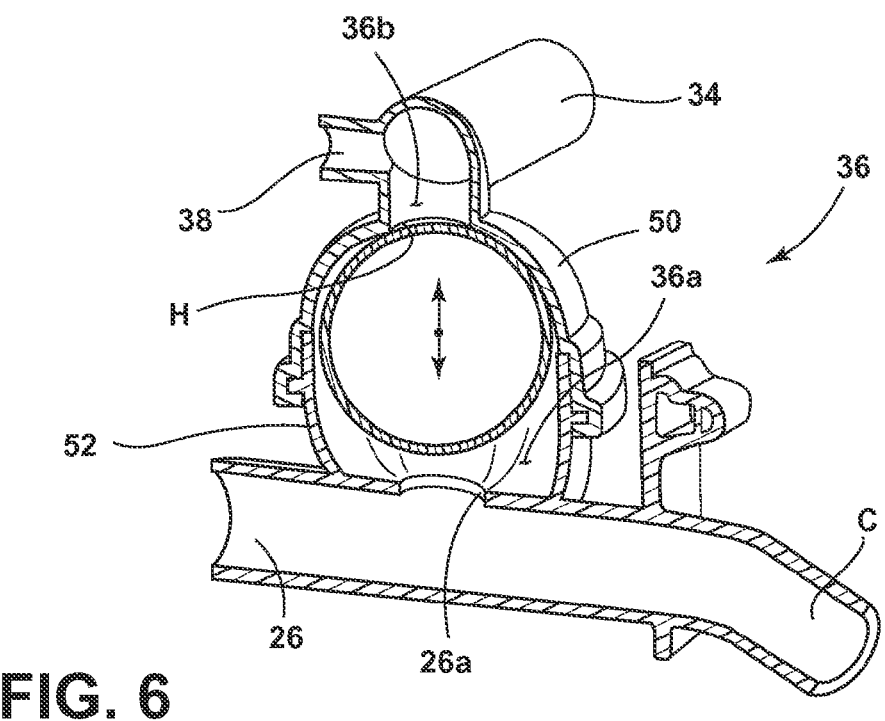
FIG. 6 is a sectioned perspective view of the component of FIG. 5.

FIGS. 5 and 6 show an example of automatic valve 36 tested by the applicant. As it is clear from FIG. 6, the valve seat H is actually defined by the connection between a semispherical upper body 50 of the automatic valve 36 and the overflow pipe 34. In a similar way, the lower valve seat 26a is defined by the connection between the discharge line 26 and a semispherical lower body 52 of the automatic valve 36. For assuring the correct function of the floating ball B, both the upper and lower semispherical bodies 50 and 52 are internally provided with guiding fins (not shown).

The automatic valve 36 comprises only three pieces, i.e. the upper body 50 with its pipe fittings for the overflow pipe 34 and the vent hose 38, the lower body 52 with its pipe fittings for the discharge line 26 and the drain pipe C, and the floating ball B. All such components may be made of polymeric material, for instance polymers or copolymers based on rubber and thermoplastic polymers. The two bodies 50 and 52 can be easily assembled by snap engagement, gluing, friction welding etc.

According to a second embodiment of the invention, it is possible also to have a different construction that works in the same way, but using a double flap valve rather than a ball valve. The three different situations (corresponding to the ones described above) are shown in FIGS. 7 to 9. In such figures a flap valve member is indicated with reference numeral 54, having a first disc-shaped flat portion 54a and a second disc-shaped flap portion 54b placed at 90° with reference to the first portion.

Figure 7:
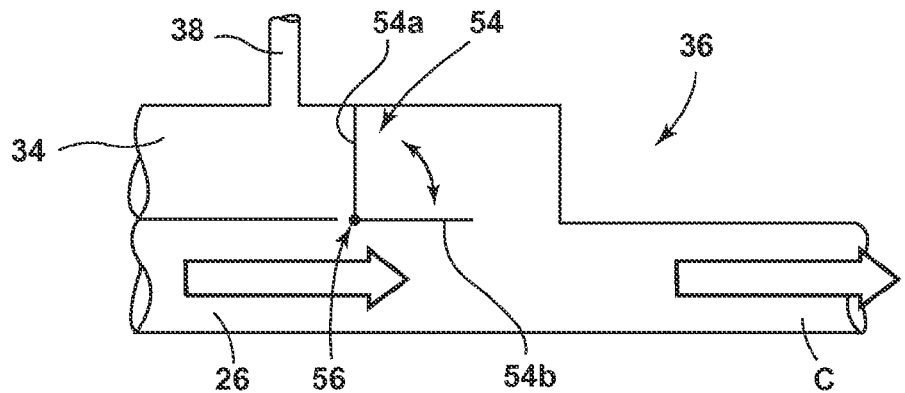
FIGS. 7-9 show a different embodiment of the component of FIGS. 2-4, in the same configuration thereof.
Figure 8:
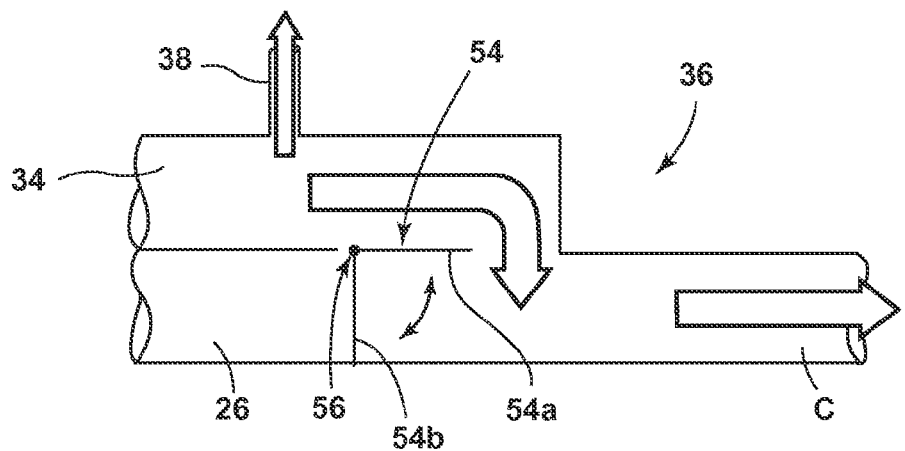

The flap valve member 54 is rotatably mounted in the body of the valve 36 along an axis 56 which is placed transversally to the lines 34, 26 and C connected to the valve 36. The valve 36 is operated automatically by the water flowing from the discharge pump 18 or from the storage tank 28. The vent hose 38 is connected to the automatic valve 36 upstream the flap valve member 54. Each disc-shaped portion 54a or 54b of the flap valve member cooperates with seats (not shown) provided in the body of the valve 36. FIG. 7 shows the configuration in which the flap valve member 54 is rotated in the upper position by the action of water flow arriving from the discharge line 26. In this configuration a communication between overflow line 34 and drain pipe C is prevented by the first portion 54a of the flap valve member 54. In the configuration shown in FIG. 8 it is the water flowing from the overflow line 34 which keeps the first portion 54a of the flap valve member 54 in a rotated position therefore closing any communication between the discharge line 26 and the drain pipe C, still allowing venting through hose 38.

Figure 9:
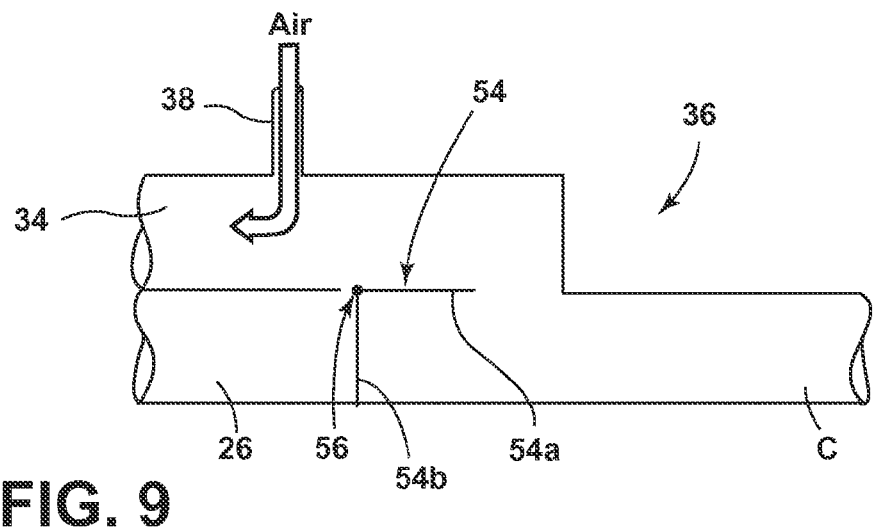

FIG. 9 shows an "idle" configuration of the flap valve member 54 (maintained by gravity) during the discharge phase from the storage tank 28.

Substantially with both the above embodiments the risk to store dirty water is completely eliminated.

What is claimed is:

1. A washing machine comprising:
   a tub;
   a drum rotatably mounted within the tub;
   a storage tank having a flow connection to the tub via a feeding line;
   a discharge pump;
   a first valve selectively coupling the discharge pump to a drain or the storage tank;
   a drain line fluidly coupling the first valve with the drain;
   an overflow line fluidly coupling the storage tank to the drain; and
   a second valve fluidly coupled with the drain line downstream of the first valve and with the overflow line downstream of the storage tank, said second valve adapted to avoid mixing a flow of liquid between the drain line and the overflow line during a washing machine cycle;
   wherein the second valve is a four-port valve.

2. A washing machine comprising:
   a tub;
   a drum rotatably mounted within the tub;
   a storage tank having a flow connection to the tub via a feeding line;
   a discharge pump;

a first valve selectively coupling the discharge pump to a drain or the storage tank;
a drain line fluidly coupling the first valve with the drain;
an overflow line fluidly coupling the storage tank to the drain; and
a second valve fluidly coupled with the drain line downstream of the first valve and with the overflow line downstream of the storage tank, said second valve adapted to avoid mixing a flow of liquid between the drain line and the overflow line during a washing machine cycle;
wherein the second valve is directly connected to the tub by a vent line.

3. The washing machine according to claim 2, wherein the second valve comprises an upper half body connected to the overflow line and to the vent line and a lower half body connected to the drain line, a first valve seat being defined by the connection of the overflow line to the upper half body and a second valve seat being defined by the connection of the drain line and the lower half body of the second valve, a floating ball being inserted between the upper and lower half bodies and acting as an automatic valve member.

4. The washing machine according to claim 3, wherein the upper and lower half bodies have a semispherical shape.

5. The washing machine according to claim 3, wherein the upper and lower half bodies are made of polymeric material.

6. A washing machine comprising:
a tub;
a drum rotatably mounted within the tub;
a storage tank having a flow connection to the tub via a feeding line;
a discharge pump;
a first valve selectively coupling the discharge pump to a drain or the storage tank;
a drain line fluidly coupling the first valve with the drain;
an overflow line fluidly coupling the storage tank to the drain; and
a second valve fluidly coupled with the drain line downstream of the first valve and with the overflow line downstream of the storage tank, said second valve adapted to avoid mixing a flow of liquid between the drain line and the overflow line during a washing machine cycle;
wherein the second valve comprises a rotating flap valve member adapted to close or open a passage between the overflow line and the drain line and the drain and to close or open a passage between the drain line and the drain.

7. The washing machine according to claim 6, wherein the rotating flap valve member comprises two orthogonal portions linked at a rotation axis.

8. The washing machine according to claim 7, wherein said rotation axis is placed transversally to the drain line, overflow line and drain connected to the second valve.

9. The washing machine according to claim 6, further comprising connecting the second valve to the tub by a vent line and wherein the vent line is connected to the second valve upstream of the flap valve member.

* * * * *